Jan. 9, 1962

N. B. COLEY 3,016,479

CYCLICAL CODE OSCILLATOR WITH MAGNETICALLY BIASED TORSION PENDULUM

Filed May 8, 1959

3 Sheets-Sheet 1

INVENTOR.

N. B. COLEY

BY Forest B. Hitchcock

HIS ATTORNEY

Jan. 9, 1962 N. B. COLEY 3,016,479

CYCLICAL CODE OSCILLATOR WITH MAGNETICALLY BIASED TORSION PENDULUM

Filed May 8, 1959 3 Sheets-Sheet 2

INVENTOR.
N. B. COLEY
BY Forest B. Hitchcock
HIS ATTORNEY

STEPPING RELAY PICKUP DURING OSCILLATOR ENERGIZATION

INVENTOR.
N. B. COLEY
BY Forest B. Hitchcock
HIS ATTORNEY

United States Patent Office 3,016,479

Patented Jan. 9, 1962

3,016,479

CYCLICAL CODE OSCILLATOR WITH MAGNETICALLY BIASED TORSION PENDULUM

Nelson B. Coley, Honeoye Falls, N.Y., assignor to General Railway Signal Company, Rochester, N.Y.

Filed May 8, 1959, Ser. No. 811,964
4 Claims. (Cl. 317—171)

This invention relates to oscillators of the torsional type and more particularly to cyclical code oscillators utilizing a predetermined number of free oscillations of a torsional pendulum to control a cycle of operation for a code type communications system.

Certain code type communications systems utilize torsional pendulum oscillators at both the sending station and the receiving station. The pendulums of the two oscillators are normally retained locked in one of their extreme positions during the interim between code communication cycles. When a code communication cycle is initiated, the pendulums of both oscillators are released simultaneously and allowed to oscillate freely for a predetermined number of free oscillations, the successive half cycles of harmonic pendulum motion marking off successive steps for the code communication system. In one type of cyclical code oscillator presently in general use, the pendulum, during the interim between code communication cycles, is locked in one of its extreme positions by means of a magnetic field generated by an electromagnet. Upon the initiation of each code communication cycle, energy is removed from the electromagnet and the pendulum begins its free swinging oscillations. At the end of each code communication cycle, the electromagnet is once again energized and the pendulum is snapped back into its normally locked position, the electromagnet remaining energized until the next code communication cycle is initiated. Thus, it can be seen that the type of cyclical code oscillator presently in use places a constant drain on its power supply (usually a battery) during the normally inactive periods of the communication system. This power drain is highly undesirable, particularly in remote locations where the communication system remains inactive for a large part of the time.

The invention disclosed herein overcomes the power drain during the inactive periods of the communication system by locking the pendulum of the oscillator in one of its extreme positions by means of a magnetic field generated by a large permanent magnet. In conjuction with this permanent magnet, the oscillator disclosed herein has a normally deenergized electromagnet with a split core. In its normally deenergized state, the air gap in the core of the electromagnet creates a high reluctance path for the flux of the permanent magnet so that most of the flux generated by the permanent magnet flows through the lower reluctance path provided by the pole pieces of the oscillator and the armature attached to the torsional pendulum. This last named flux path provides the magnetic field that retains the pendulum locked in one of its extreme positions. When a code communication cycle is initiated, the electromagnet is energized. While the flux generated by the electromagnet does not oppose the flux within the permanent magnet itself, thus preventing the gradual breakdown of the permanent magnet, the magnetic field of the electromagnet does oppose the magnetic field of the permanent magnet in the armature region of the pole pieces.

The energization of the electromagnet thus effectively neutralizes the magnetic flux holding the armature, and the torsional force of a spiral spring causes the armature assembly to oscillate freely until the electromagnet is once again deenergized at the end of the code communication cycle. Therefore, electrical energy is only required by the cyclical oscillator during the active periods of the communication system, which is a small percentage of the total time.

An object of the present invention is to provide a cyclic code oscillator of the torsional pendulum type which will operate in an accurate and reliable manner through a predetermined number of free oscillations, and which requires electrical energy only during its periods of activity.

It is a further object of this invention to provide a cyclical code oscillator of the torsional pendulum type whose pendulum is retained locked in one of its extreme positions by a magnetic field generated by a permanent magnet, and whose pendulum is allowed to oscillate freely whenever the magnetic field of the permanent magnet is neutralized by the energization of an electromagnet operating in correspondence with the permanent magnet.

Other objects, purposes and characteristic features of the present invention will be in part obvious from the accompanying drawings, and in part pointed out as the description of the invention progresses.

In describing the invention in detail, reference will be made to the accompanying drawings, in which like reference characters designate corresponding parts throughout the several views, and in which.

Figures 2A, 2B:
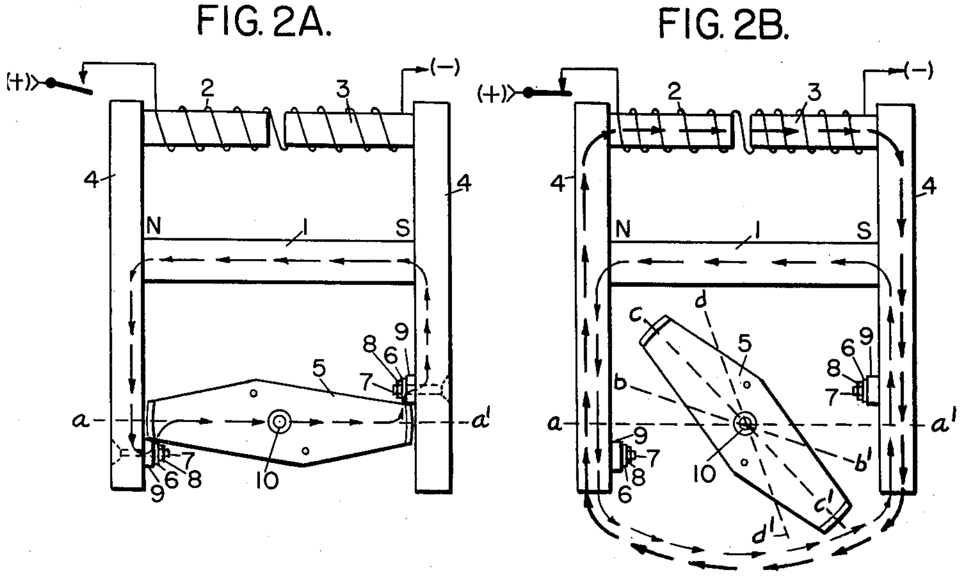
FIGS. 2A and 2B show, by means of arrows, the major flux paths through the permanent magnet, the electromagnet, the pole pieces and the armature of the oscillator when the electromagnet is in its normally deenergized state (FIG. 2A), and when the electromagnet is energized during a code communication cycle (FIG. 2B).
Figure 3A:
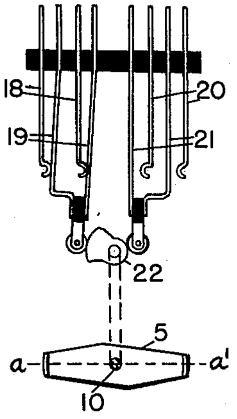
Figure 3B:
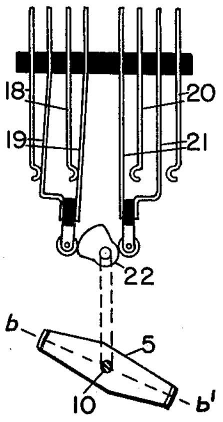
Figure 3C:
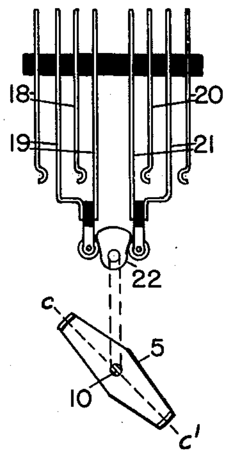
Figure 3D:
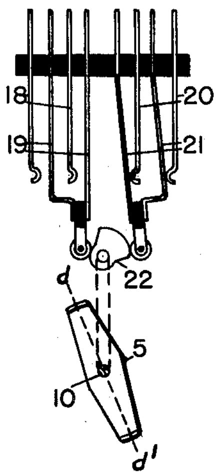
Figure 4:
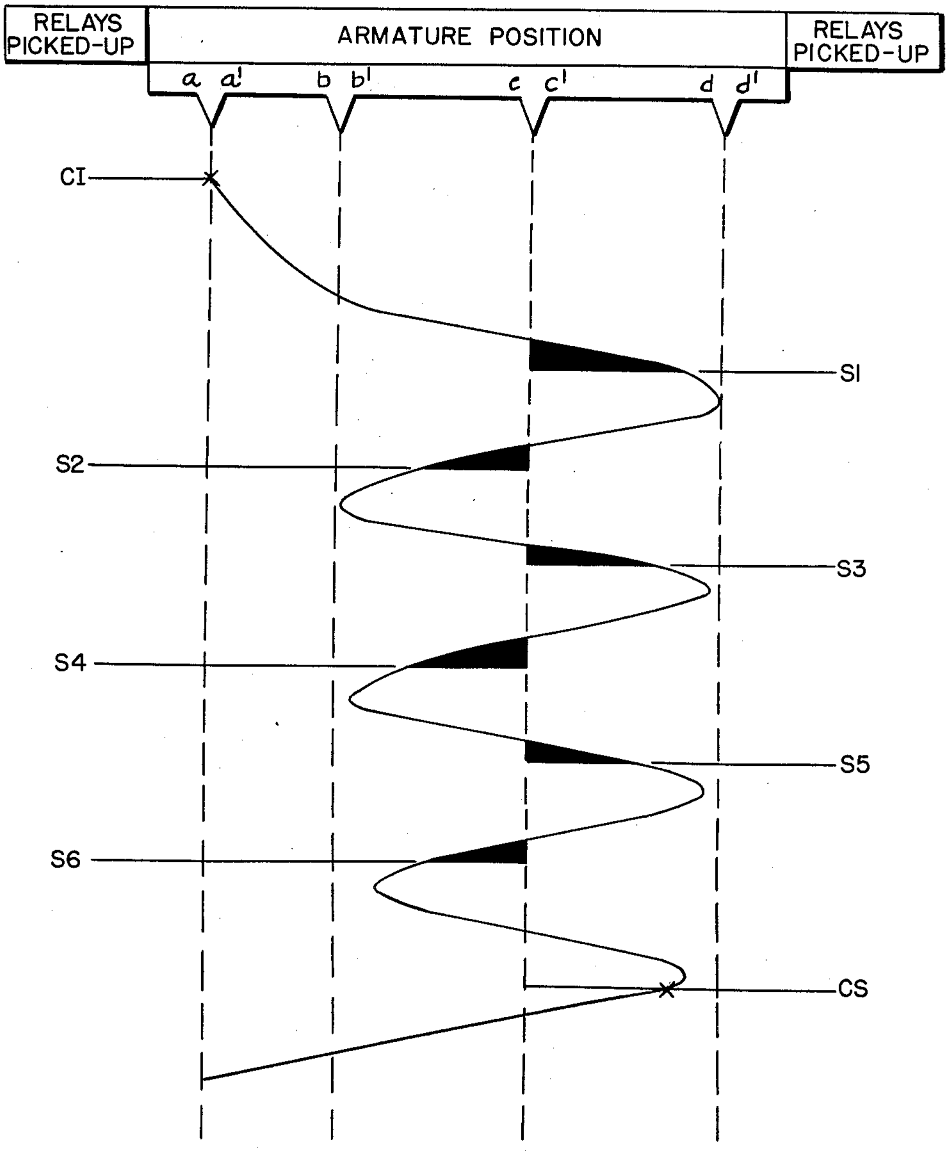

FIG. 2B also illustrates the extreme and center positions of the armature during free oscillations and when in its locked position during its normally inactive periods;

FIGS. 3A, 3B, 3C and 3D illustrate the relative positions of the electrical contact fingers and controlling cam during the locked-up and the various free swinging positions of the torsional pendulum;

FIG. 4 is a graphic presentation of the time sequence involved in the picking up of the cycle control relays and the stepping relays in response to the free oscillations of the pendulum during the active periods of code communication.

For the purpose of simplifying the illustration and facilitating in the explanation, the circuits in the accompanying drawings have been shown diagrammatically and certain conventional illustrations have been employed, the drawings having been made more with the purpose of making it easy to understand the principles and mode of operation, than with the idea of illustrating the specific construction and arrangement of parts that would be employed in practice. Thus, the various relays and their contacts are illustrated in a conventional manner, and the symbols (+) and (−) are employed to indicate the positive and negative terminals respectively of suitable batteries, or other sources of direct current, the circuits with which the symbols are used always having current flowing in the same direction.

Figure 1:
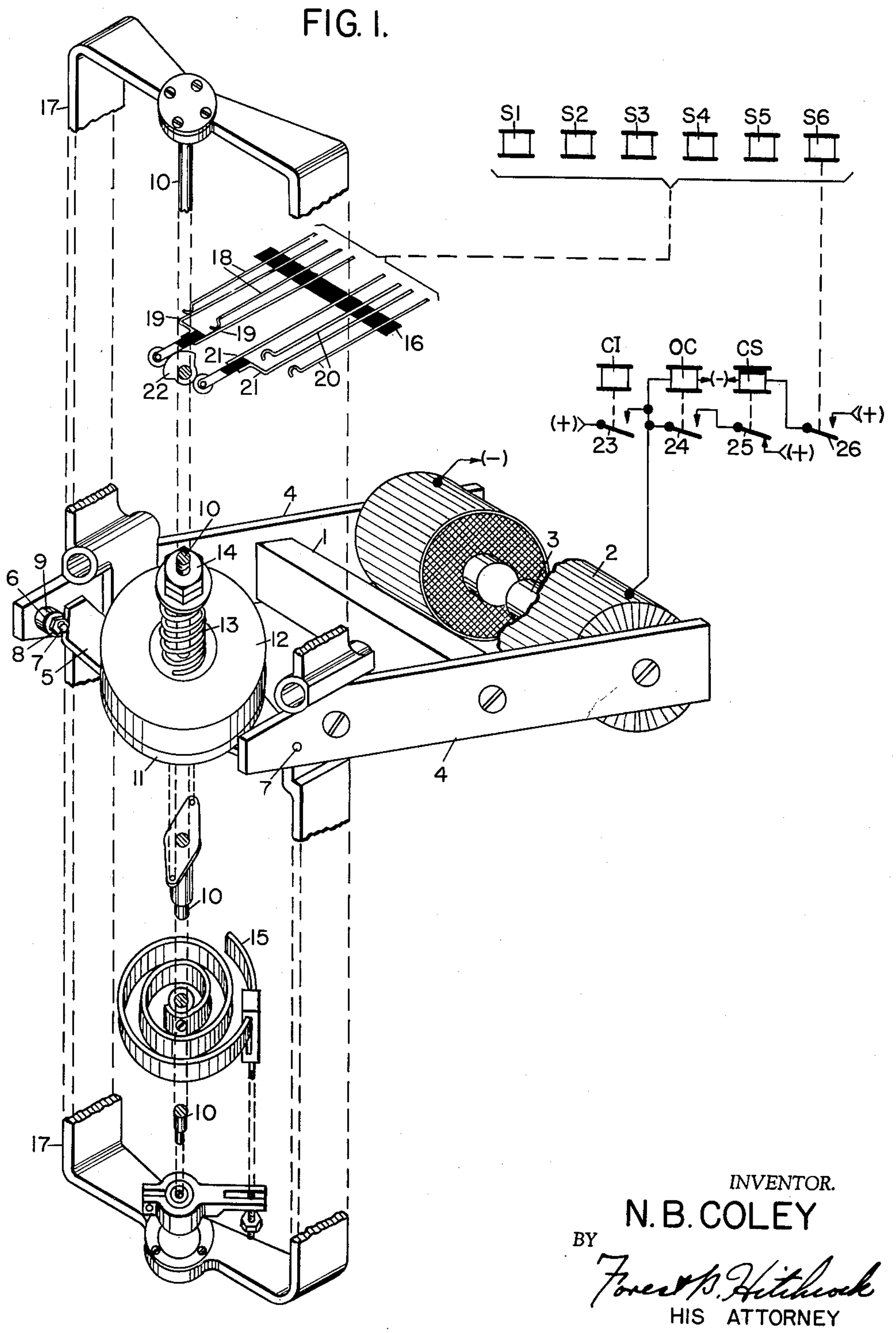
FIG. 1 is a combination exploded perspective and simplified schematic drawing illustrating the general organization of the cyclical code oscillator disclosed herein as it might be used in a code type communication system.

In FIG. 1 the essential parts of the cyclical code oscillator disclosed herein are shown in exploded perspective. Permanent magnet 1 and the electromagnet comprised of wire coil 2 wound around split core 3 are both firmly attached to pole pieces 4. Wire coil 2 is wound so that when energized, its induced electromagnetic field is complementary to the magnetic field within permanent magnet 1. When wire coil 2 is not energized, split core 3 of the electromagnet provides a high reluctance path for the flux of permanent magnet 1, and a low reluctance path for the flux of permanent magnet 1 is provided through the magnetic material of armature 5 and two stops, the latter being made up of magnetic material washers 6 attached to pole pieces 4 by means of bolts 7 and nuts 8. It should be noted that the ends of armature 5 are held against non-magnetic stop bumpers 9 and do not actually make physical contact with the magnetic materials of stop washer 6, bolt 7 or nuts 8 for reasons that will be disclosed below. (This arrangement of parts is more clearly illustrated in FIG. 2A.)

Armature 5 is centrally pivoted and securely attached to vertical shaft 10 and friction plate 11. Pendulum 12 is rotatably mounted on vertical shaft 10 and biased against friction plate 11 by means of compression spring 13 which in turn is secured by nut 14. The purpose of this last described structure is to reduce excessive strain to shaft 10, to armature 5 and to the stops which would otherwise be caused when the rotating pendulum assembly is abruptly stopped against the stops at the end of the cycle of the oscillations as will be described in detail.

Vertical shaft 10 is biased by involute spring 15 which is under tension when the pendulum assembly is in the position shown, the torsional force of the spring opposing the magnetic force holding armature 5 against the stops. The inner end of involute spring 15 is secured to vertical shaft 10, and the tension of the spring is adjustable so that identical rates of oscillation may be maintained for each of the various cyclical code oscillators used in any one particular communication system.

Electrical contact support 16 is attached to bracket 17 which is of non-magnetic material and which also provides bearings to support vertical shaft 10. Embedded in electrical contact support 16 are four sets of contact fingers. The two sets of left-hand contact fingers are comprised of fixed fingers 18 and movable fingers 19, while the two right-hand sets are comprised of fixed fingers 20 and movable fingers 21. Movable fingers 19 and 21 are selectively opened and closed against cooperating fixed fingers 18 and 20 respectively by the actuation of cam 22 which is secured to shaft 10. During the periods when the pendulum assembly is allowed to oscillate freely, the roller tips of movable fingers 19 and 21 ride up and down on cam 22 which oscillates with shaft 10 and the remainder of the pendulum assembly. Cam 22 is so disposed on shaft 10 that if the pendulum assembly is allowed to oscillate until it comes to rest in its neutral position, the respective rollers of movable fingers 19 and 21 will come to rest on cam 22 so that the respective sets of electrical contacts will be open, and so that a slight rotation of shaft 10 in either direction will close, respectively, one set of electrical contacts or the other.

*Operation*

In order to facilitate the explanation, it will be assumed that the cyclical oscillator disclosed herein is being used in a normally inactive code communication system for the purpose of setting a standard time rate for the energization of stepping relays controlling coding circuits. Referring now to the simplified schematic portions of FIG. 1, it is assumed that the circuits for stepping relays S1 through S6 are so arranged that these relays will be picked up serially in response to impulses generated by the closing of electrical contact fingers 18, 19, 20 and 21 as will be explained below, and it is also assumed that cycle initiator relay CI picks up in response to a line circuit signal that is received simultaneously by each station in the system.

When a communication cycle is initiated by an appropriate line circuit signal, cycle initiator relay CI is picked up, closing front contact 23. This closes the circuit from (+) through contact 23 and wire coil 2 to (−), causing the build-up an induced electromagnetic field in split core 3. This effects the release of armature 5.

The theory underlying this method of releasing armature 5 can best be understood by referring to FIGS. 2A and 2B. During the normally inactive period, split core 3 presents a high reluctance path to the flux of permanent magnet 1 by virtue of its air gap, and so most of the flux of permanent magnet 1 follows the path of lesser reluctance outlined in FIG. 2A by the light arrows which pass in a counter-clockwise direction through pole pieces 4, screws 7, washers 6 and armature 5. When a code cycle is initiated and wire coil 2 is energized, the magnetic field induced by wire coil 2 effectively neutralizes the field of permanent magnet 1 in the armature ends of pole pieces 4. FIG. 2B illustrates, by means of heavy arrows, the path followed by the majority of the flux generated by wire coil 2. It should be noted that the magnetic field induced by the electromagnet does not oppose but, rather, aids the field within permanent magnet 1, thus assuring the latter's continued efficiency.

The neutralizing of the field of permanent magnet 1 in the armature end of pole pieces 4 reduces the magnetic force holding armature 5 against the stop bumpers 9, and the torsional force of involute spring 15 pulls armature 5 away from the stops, permitting oscillation of the pendulum assembly. It should be again noted in FIG. 2A that armature 5 does not make actual physical contact with any of the magnetic materials of the stops. This assures that armature 5 will not be held in its locked up position, subsequent to the energization of the electromagnet, by reason of any residual magnetism in the armature end of the pole pieces.

Returning momentarily to FIG. 1, when cycle initiator CI is pocked up closing front contact 23, a circuit is also closed from (+), front contact 23 through the windings of oscillator control relay OC, to (−). This causes oscillator control relay OC to pick up closing front contact 24 and completing a stick circuit for the electromagnet from (+), back contact 25 and front contact 24, through wire coil 2, to (−). This maintains the energization of the electromagnet throughout the code cycle and permits the free oscillation of the torsional pendulum assembly.

Referring to FIG. 2B, when armature 5 is first released, the torsional force of involute spring 15 causes the pendulum assembly to swing to the right (clockwise) through its neutral position, designated by line *c—c'*, to its extreme right position, designated by line *d—d'*. Since the magnetic field of permanent magnet 1 present in the armature end of pole pieces 4 is not neutralized instantaneously, armature 5 tends to accelerate slowly at the start due to the retarding effect of this residual magnetic field. Thus, during the pendulum assembly's initial swing to the right, some of the torsional force of pendulum 12 and involute spring 15 is dissipated in overcoming the effect of this residual magnetic field, and on the return swing to the left (counter-clockwise), armature 5 will be restored an appreciable distance short of the stops. This becomes the extreme left-hand position of the normal pendulum cycle and is designated in FIG. 2B by line *b—b'*. The pendulum assembly continues to swing freely to the right and left within the limits illustrated in FIG. 2B in accordance with the general principles of pendulum oscillation. It is well-known that a freely oscillating torsional pendulum develops harmonic motion of steadily decreasing amplitude but of constant period, and it has been found that the cyclical oscillator herein will oscillate through many cycles of useful code operation, and that, as expected, the time consumed by each of the cycles is constant.

FIGS. 3A, 3B, 3C and 3D show the relative positions of cam 22 and the electrical contact fingers for each position of pendulum motion. As can be seen from this series of drawings, whenever the armature is in a position between its left-hand extreme position, designated by $b—b'$, and its neutral position, designated by $c—c'$, left-hand fingers 18 and 19 are closed and right-hand contacts 20 and 21 are open; and similarly, whenever armature 5 is between its neutral position ($c—c'$) and its extreme right-hand position ($d—d'$), left-hand contact fingers 18 and 19 are open and right-hand contact fingers 20 and 21 are closed.

Assuming, arbitrarily, that the code oscillator illustrated in FIG. 1 is used to count off only six steps, reference is now made to FIG. 4, in which a curve is plotted of armature travel against time. This illustrates that subsequent to the energization of the electromagnet by the picking up of cycle initiator relay CI, each successive swing of armature 5 through its neutral position $c—c'$ (for the first three cycles of the pendulum assembly) is effective to pick up a stepping relay. The relays for the odd numbered steps S1, S3 and S5 are picked up in respone to the closure of the right-hand contact fingers 20 and 21, and even numbered stepping relays S2, S4 and S6 are picked up by the closure of left-hand contact fingers 18 and 19. The respective pick-up circuits for these stepping relays are obviously closed as the pendulum assembly passes through its neutral position $c—c'$, and the times represented by the shaded areas of the curve illustrate the pick-up times of the respective stepping relays subsequent to their energization.

As shown by the curve in FIG. 4, while the amplitude of the oscillations decreases a small amount during each cycle of the energized period, the time for each cycle remains constant. Thus the free oscillation of the torsional pendulum assembly is effective to set up a standard time rate for controlling the pick-up of the stepping relays. It is this obvious feature that permits this type of cyclical code oscillator to be used as a standard code cycle generator in code type communication systems.

Returning now to the simplified schematic drawing in FIG. 1, when stepping relay S6 picks up in response to the third cycle of pendulum oscillation, front contact 26 is closed. This completes a circuit from (+), front contact 26 and the windings of cycle stop relay CS, to (−). Cycle stop relay CS is a slow pick-up relay, its time delay being equivalent to approximately three quarters of the period of the torsional pendulum. When cycle stop relay CS picks up, back contact 25 is opened, thus opening the stick circuit for the electromagnet.

When the electromagnet is deenergized, its magnetic field collapses and the field of permanent magnet 1 is once again effective in the armature end of pole pieces 4. Thus, on the fourth cycle of pendulum motion, as illustrated by the curve in FIG. 4, when armature 5 swings to its left-hand position, the torsional force of involute spring 15 is overcome by the magnetic force generated by the field of permanent magnet 1 and armature 5 is locked once again in its normal position against the stops (FIG. 2A). When the swing of armature 5 is abruptly halted against the stops, pendulum 12 slips with respect to friction plate 11 (FIG. 1), thus permitting the inertia of pendulum 12 to be absorbed without excessive strain being applied to the stops and to the pendulum assembly as a whole.

Attention is called to the fact that in this locked position, the flux of permanent magnet 1 passes from magnetic washers 6 to armature 5 in lines perpendicular to the radius of armature 5. In this way, the flux of permanent magnet 1 maintains a torsional pull on armature 5, directly opposing the torsional force of involute spring 15 and locking armature 5 against the stops.

Having described one specific embodiment of the present invention, it should be understood that this form has been selected to facilitate the disclosure of the invention rather than to limit the number of forms which it may assume, and it is to be further understood that various modifications, adaptations and alterations may be applied to the specific form shown to meet the requirements of practice, without in any manner departing from the spirit or scope of the present invention.

What I claim is:

1. A normally inactive cyclical code oscillator comprising, two pole pieces, a permanent magnet and a normally deenergized electromagnet secured in tandem to said two pole pieces, a spring biased torsional pendulum, a magnetic armature adapted to rotate with said pendulum between said pole pieces, said armature being torsionally attracted by the flux of said permanent magnet when said electromagnet is in its normally deenergized state and the torsional force exerted on said armature by the flux of said permanent magnet being in opposition to the torsional force of said spring, stop means for limiting the rotation of said armature in the direction of said torsional force exerted on said armature by the flux of said permanent magnet, whereby the energization of the electromagnet reduces said torsional force exerted on said armature by the flux of said permanent magnet, and is initiated into free oscillations by said torsional force of said spring.

2. A cyclical code oscillator comprising, a rotatable shaft, a torsional pendulum secured on said rotatable shaft, a spring biasing said shaft to a neutral position with respect to rotation, two pole pieces, a permanent magnet and a normally deenergized electromagnet secured in tandem to said two pole pieces, the direction of the windings of said electromagnet being such that when said electromagnet is energized its induced electromagnetic flux is complementary to the flux of said permanent magnet, but opposes the flux produced by said permanent magnet in said pole pieces, a magnetic armature secured to said shaft, said magnetic armature being attracted by the torsional force of the flux of said permanent magnet in opposition to the torsional force of said spring when said electromagnet is in its normally deenergized state, a stop adapted to limit the rotation of said armature in response to the torsional force generated by the flux of said permanent magnet, whereby said armature is held locked against said stop until such time as said electromagnet is energized, and whereby, upon the energization of said electromagnet, the torsional force exerted on said armature by the flux of said permanent magnet is reduced and the torsional force of said spring sets said torsional pendulum into free oscillations.

3. A cyclical code oscillator comprising, a permanent magnet having two oppositely disposed pole pieces, a normally deenergized electromagnet having a split core with an air gap between the halves thereof secured to said pole pieces, a rotatable shaft disposed between said pole pieces, a torsional pendulum mounted on said shaft, a stop secured to each said pole piece, a magnetic armature secured on said shaft and adapted to be rotatably attracted by the flux of said permanent magnet when said electromagnet is in its normally deenergized state to a position contacting both said stops simultaneously, and a torsional spring secured to said shaft biasing said armature away from said stops to a neutral position in respect to rotation.

4. A cyclical code oscillator comprising, two oppositely disposed pole pieces, a permanent magnet and a normally deenergized electromagnet secured in tandem to said two pole pieces, said electromagnet having an air gap separating the opposite ends of its core, a spring biased rotatable shaft with a torsional pendulum mounted thereon disposed between and equidistant from said pole pieces, a magnetic armature secured to said shaft, said armature being rotatably attracted to said pole pieces by the torsional force exerted upon it by said permanent magnet when said electromagnet is in its deenergized state, a magnetic stop partially shielded by a non-magnetic bumper secured to each said pole piece, said stops being so disposed to limit the rotation of said armature in response to the torsional force of said permanent magnet by contacting said armature simultaneously against said non-magnetic bumpers, whereby said armature is normally held against said stop bumpers, but oscillates freely in accordance with the physical properties of said torsional pendulum and said spring for a number of free oscillations when said electromagnet is steadily energized.

References Cited in the file of this patent

UNITED STATES PATENTS

| | | |
|---|---|---|
| 1,913,826 | Blosser | June 13, 1953 |
| 2,814,765 | Scheg | Nov. 26, 1957 |
| 2,888,290 | Pierce | May 26, 1959 |